United States Patent [19]

Kamiyama et al.

[11] 4,437,153

[45] Mar. 13, 1984

[54] APPARATUS CONTROL SYSTEM

[75] Inventors: Mituo Kamiyama, Tokyo; Hirotoshi Namazue, Yokohama, both of Japan

[73] Assignee: Kokusan Kinzoku Kogyo Kabushiki Kaisha, Tokyo, Japan

[21] Appl. No.: 300,472

[22] Filed: Sep. 9, 1981

[51] Int. Cl.$^{3}$ ........................ G06F 15/46; B60R 25/10

[52] U.S. Cl. .............................. 364/140; 307/10 AT; 340/63; 340/825.31; 361/172; 364/184; 364/424

[58] Field of Search ............... 364/400, 424, 425, 140, 364/184; 340/63, 64, 542, 543, 825.3, 825.31, 825.32, 825.34, 825.56, 146.2; 180/272, 287; 307/10 R, 10 AT; 361/1, 171, 172

[56] References Cited

U.S. PATENT DOCUMENTS

| | | | |
|---|---|---|---|
| 3,755,776 | 8/1973 | Kotras | 340/63 X |
| 4,148,092 | 4/1979 | Martin | 361/172 |
| 4,205,325 | 5/1980 | Haygood et al. | 340/63 X |
| 4,206,491 | 6/1980 | Ligman et al. | 307/10 AT X |
| 4,267,578 | 5/1981 | Vetter | 364/709 |
| 4,366,466 | 12/1982 | Lutz | 340/825.31 X |

*Primary Examiner*—Joseph F. Ruggiero

*Attorney, Agent, or Firm*—Fleit, Jacobson, Cohn & Price

[57] ABSTRACT

In the present invention, the control system comprises a number presetter in the form of a switch board including a certain number of, say five, pushbutton switches. By depressing them sequentially and selectively in a desired order, an arbitrarily selected number code signal can be delivered. This number code signal may have five or seven digits, as an example. Further, there is a first memory which has a predetermined memory content representing a permanent code signal specifically selected at a vehicle manufacturing stage which is unique to the automotive vehicle under consideration. As an example, this may be "5 - 1 - 4 - 3 - 2 - 1- 5". Further, there is a first comparator adapted for comparison of the permanent memory content in the first memory, with an arbitrary number code signal generated at and delivered from the switch board. If there is coincidence between the both signals, the switch board's outlet signal is conveyed to a second memory. There is a second comparator adapted for comparison of the switch board output or arbitrary code signal with the content of the second memory. An address counter is provided with functions to deliver address signals to said first and second memories upon reception of the arbitrary code signal from the switch board.

There are further provided a first and a second shift register adapted for receiving output signals from the first and the second comparator, respectively.

4 Claims, 3 Drawing Figures

APPARATUS CONTROL SYSTEM

BACKGROUND OF THE INVENTION

This invention relates generally to improvements in and relating to pushbutton-operated controls adapted for on-off and functional control of various appliances, and more specifically for those usable in and on automotive vehicles. Thus, the present invention may be applied to the control of automotive door locks, on off control of an engine, trunk lid lock, openable ceiling panel on-off control, on off control of interior light(s), driver's seat door lock and the like.

As a representative example, although not limited only thereto, the following description will be directed mainly to an automotive door lock and unlock system.

It has already been proposed to control the automotive door locks by means of pushbuttons in place of conventional engine key and the like. In this case, these locks are designed into solenoid-operated electric locks which are functionally controlled by electronic circuits.

This kind of electronic control system comprises a memory which is adapted for memorizing a specifically selected permanent code signal by sequential manipulation of push-buttons constituting a code presetter. There is a comparator which is adapted for making comparison of an arbitrary code signal introduced by similar manipulation of the presetter pushbuttons, with the memorized permanent code signal. If there is a coincidence between both, the electric lock(s) are unlocked. There may occur, however, that an unauthorized person is knowledgeable of the already specified permanent code signal, leading thus to a theft unlocking.

For effectively solving such kind of theft unlocking, it has already been proposed to provide an arbitrary code signal memory in such a way that the operator can modify or completely change the once preset control code signal. With such memory system as mentioned above, a door lock release can be performed by later and intentional introduction of either the permanent or the arbitrary code signal by sequential manipulation of the presetter pushbutton switches. With adoption of such memory system, however, the selectability of either code signal will be reduced so far that the possibility of confusion among prevailing automotive vehicles and a theft unlocking accident might occur.

SUMMARY OF THE INVENTION

An object of the present invention is to provide an efficient pushbutton-controlled state or function control device wherein confusion and theft control accident can be minimized.

In the present invention, the control system comprises a number presetter in the form of a switch board including a certain number of, say five, pushbutton switches. By depressing them sequentially and selectively in a desired order, an arbitrarily selected number code signal can be delivered. This number code signal may have five or seven digits, as an example. Further, there is a first memory which has a predetermined memory content representing a permanent code signal specifically selected already at a vehicle manufacturing stage and peculiar to the automotive vehicle under consideration. As an example, this may be "5-1-4-3-2-1-5". Further, there is a first comparator adapted for comparison of the permanent memory content in the first memory, with an arbitrary number code signal generated at and delivered from the switch board. If there is coincidence between the both signals, the switch board's outlet signal is conveyed to a second memory. There is a second comparator adapted for comparison of the switch board output or arbitrary code signal with the content of the second memory. An address counter is provided which functions to deliver address signals to said first and second memories upon reception of the arbitrary code signal from the switch board.

There are further provided a first and a second shift register adapted for receiving output signals from the first and the second comparator, respectively.

An apparatus to be controlled, such as an electric lock, is brought into actuation or release, as the case may be, or unlocked in the case of the electric lock, upon reception of the switch board's output number code signal and the output signal from the related shift register, when there is a coincidence between the last mentioned two output signals.

In the preferable arrangement, the first memory adapted for memorizing the permanent number code signal is a P-ROM, while the second memory adapted for memorizing the arbitrary number code signal is a RAM.

The push button board comprises further and additionally a correction service pushbutton which is electrically connected to a number correction circuit which functions to correct incorrect signal as a result of false-key-operation at the number presetter switch board, and indeed in such a way that the address counter and the shift register are brought restoringly to such a functional position just one digit before the incorrect and to-be-cancelled digit or digit series, as the case may be, and upon depression of the number correction pushbutton.

The apparatus to be controlled is controlled through a RS-flip-flop which is set when the first shift register becomes high at its all inputs as a result of introduction of a correct number code signal by manipulation of the number correction service pushbutton.

This and further objects, features and advantages of the invention will become more apparent from the following detailed description which should be read in connection with the drawings in which:

DETAILED DESCRIPTION OF THE INVENTION

Figure 1:
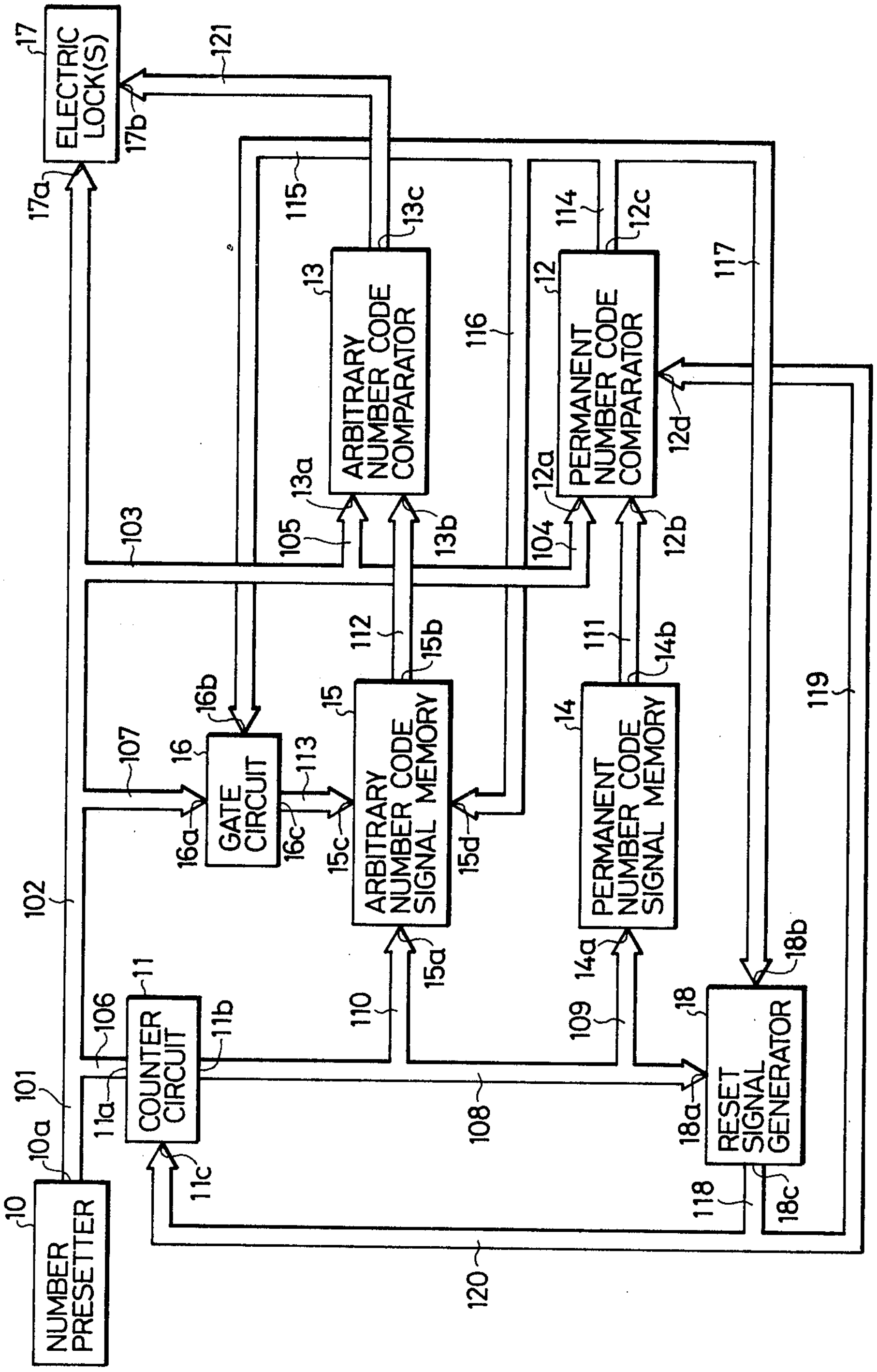
FIG. 1 is a schematic diagram of a preferred embodiment of the invention.

In the following, a preferred embodiment of the invention will be illustrated with reference to the drawings, FIGS. 1 and 2.

Numeral 10 denotes generally a number presetter which includes a preferred number of manually operable pushbutton switches, as is commonly well known in the art and to be more fully described hereinafter.

Output 10*a* of the presetter 10 is connected electrically to the first inlet 11*a* of a counter 11 through electrical connections 101 and 106 to a counter 11.

The output 10*a* is also connected through connections 101-102-103-104 to the first inlet 12*a* of a first comparator 12 and through connections 101-102-103 and 105 to the first inlet 13*a* of a second comparator 13, respectively.

Output 11*b* of the counter 11 is electrically connected through connection 108 directly to the first inlet 18*a* of a reset signal generator 18. At the same time, the outlet 11*b* is electrically connected through connections 108-109 to the inlet 14*a* of a first memory 14 and through connections 108-110 to the inlet 15*a* of a second memory 15, respectively.

As will be hereinlater more fully described, the counter 11 is so designed and arranged to count the output signal from the presetter 10 and to feed the counted signal to memories 14 and 15, respectively. In the specific embodiment shown, first memory 14 has been designed as a P-ROM, while the second memory 15 has been designed as a RAM.

Output from first memory 14 is fed from 14*b* through connection 111 to the second inlet 12*b* of first comparator 12. In the similar manner, output from second memory 15 is fed from 15*b* through connection 112 to the second inlet 13*b* of second comparator 13.

Numeral 16 is a gate circuit which has a first inlet 16*a* adapted for receiving output of the presetter 10 through connections 101-102-107. The gate 16 has a second inlet 16*b* which is adapted for receiving output signal from the output 12*c* of first comparator 12 through electrical connections 114-115. The output 16*c* of gate 16 is electrically connected through connections 113 to the second inlet 15*c* of second memory 15. Second memory 15 has a third inlet 15*d* which is adapted for receiving the output signal of the first comparator 12 from its outlet 12*c* through 114, a part of 115 and 116.

Reset signal generator 18 has the second inlet 18*b* which is adapted for receiving output signal from the output 12*c* of the first comparator 12 through connections 114-117.

Reset signal generator 18 has a output 18*c* which is adapted for feeding the reset signal to a third inlet 12*d* of first comparator 12 and a second inlet 11*c* of counter 11 through connections 118-119 and 118-120, respectively.

Numeral 17 represents an electrical lock which is designed for on-off control of the function of an automotive door or the like. The lock 17 has a first inlet 17*a* which is adapted for receiving output signal from the presetter 10 through connections 101-102. The lock 17 has a second inlet 17*b* which is electrically connected to the outlet 13*c* of the second comparator through connection 121.

In the following, the operation of the inventive arrangement shown rather generally in the block diagram of FIG. 1 will be described in detail, together with the construction and operation of a more specifically shown arrangement in FIG. 2.

It should be noted that in the shown embodiment, two kinds of signal codes, the permanent signal code and the arbitrary signal code, are used. Although not limiting the invention, the present embodiment is so designed and arranged that the permanent signal consists of 7-digit code and the arbitrary signal consists of 5-digit code. The signal code is delivered by operating the presetter 10, and fed to counter 11 and first and second comparators 12 and 13.

Depending upon the address signal delivered by the counter 11, the content of first memory 14 which is destined for permanent signal code, or the content of second memory 15 which is destined for arbitrary signal code, are determined, as the case may be. The output from the first memory or that from the second memory is fed to the first comparator 12 or the second comparator 13, respectively.

When comparison is made in the second or arbitrary code comparator 13 between the output from presetter 10 and the stored content in the second or arbitrary code memory 15 and there is coincidence between the both, a coincidence signal will be delivered from the comparator to the electric lock 17 which is then unlocked.

If there is a plurality of electrical locks arranged, although not shown, additional and different signal code(s) may be delivered by the presetter 10 by manipulating the latter properly, and a similar comparison job as described above may be carried into effect in the arbitrary code comparator 13 and the desired electric lock(s) as at 17 may be locked in the similar manner.

When comparison is made at the first comparator 12 between the 7-digit code delivered by presetter 10 and the memorized content in the first memory 14, and there is a coincidence, a memory instruction signal will be fed from the comparator to the gate 16 which is opened therewith and the output from the presetter to the second memory 15 is then brought into the written-in state. Further, an output signal is delivered by the comparator 12 to the counter 11 through reset signal generator 18, thereby causing the counter to reset.

Then, when the operator operates the presetter 10 so as to generate a 5-digit signal, it will be fed into the second memory 15. Upon counting five at the counter 11, a reset signal will be fed from the generator 18 to the counter and the first comparator, thereby these latter both being reset and the gate 16 being closed. Then, the second memory 15 is brought into its read-out state. Under these conditions, when the output from the presetter 10 and the content at the second memory 15 are brought into coincidence, the electrical lock is caused to unlock, as was briefly described hereinbefore.

Figure 2A:
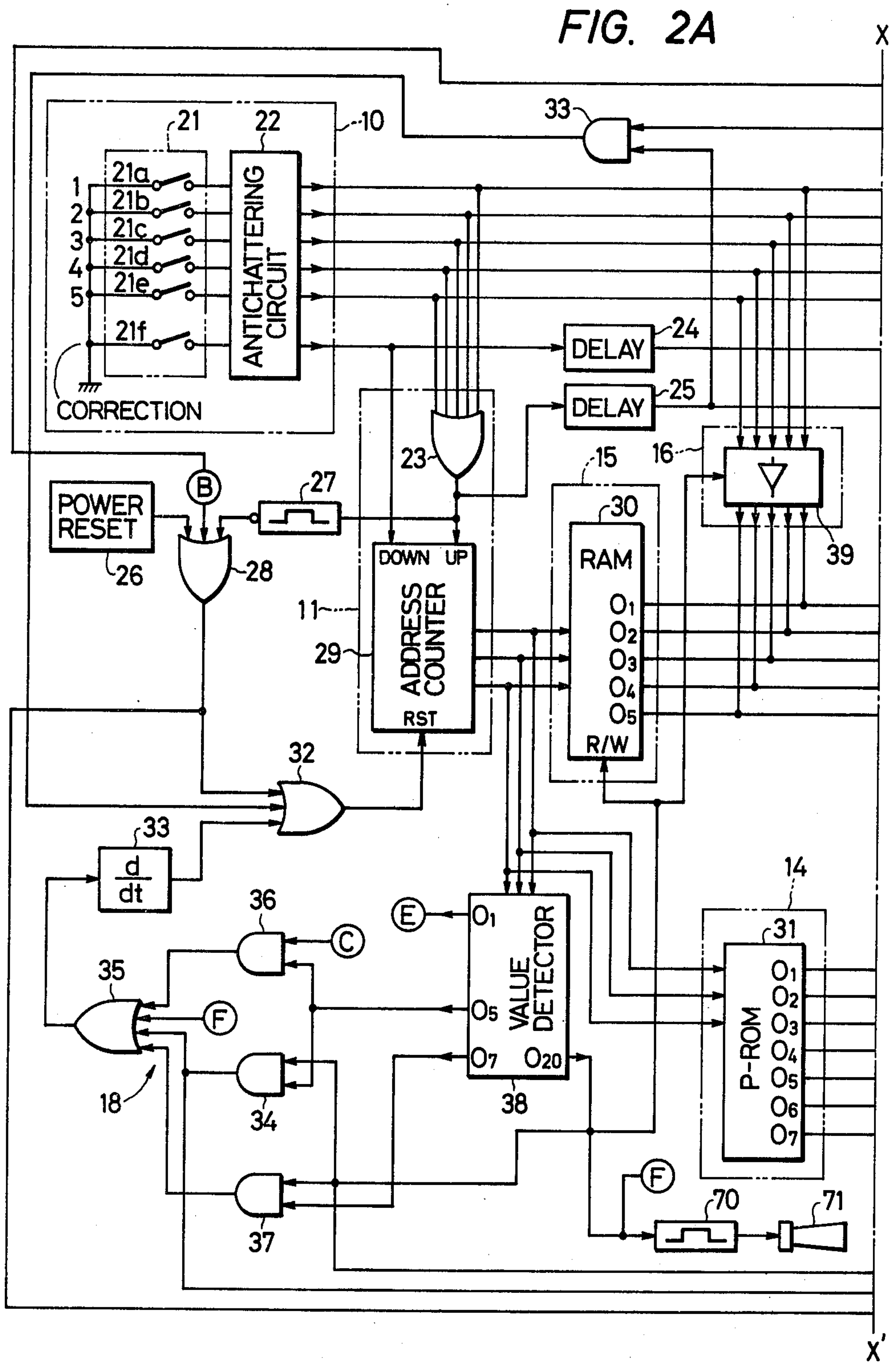
FIG. 2 is a more detailed circuitry of the same embodiment, which has been separated into FIGS. 2A and 2B along a chain-dotted partition line X—X'.
Figure 2B:
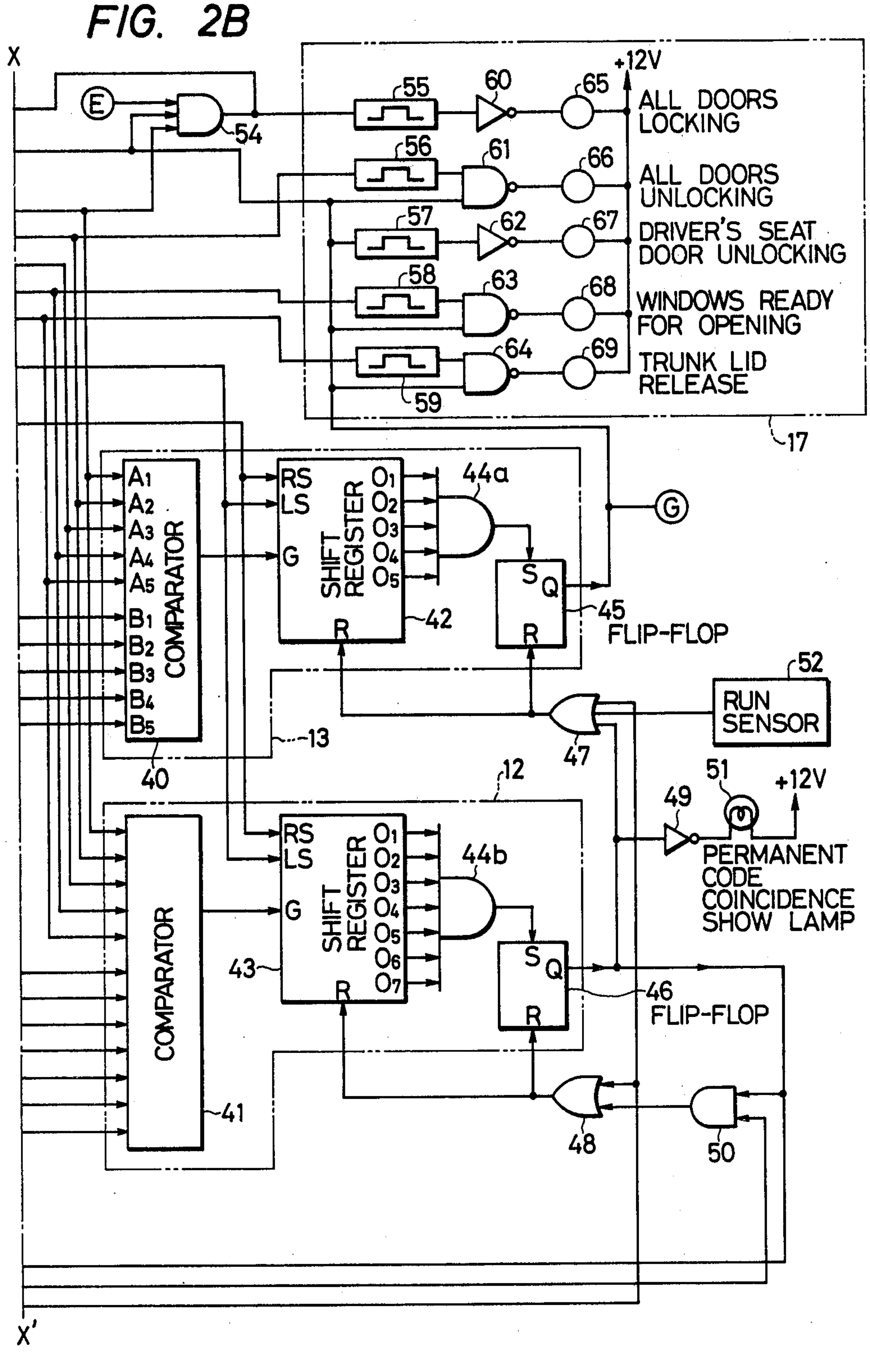

Now turning to FIG. 2, the presetter 10 includes a switch board 21 having five pushbuttons 21*a*, 21*b*, 21*c*, 21*d* and 21*e* carrying thereon numerals 1-5 as shown. Signal codes can be generated and delivered by manipulating these pushbutton switches selectively one after another. This output signal will be fed through antichattering circuit 22 of known structure to an OR-gate 23. The circuit 22 is also included in the resetter 10 as shown.

Output signal from OR-gate 23 may be fed to first delay circuit 25 which provides a proper timing for the signal to be fed to the following circuits.

Output signal from OR-gate 23 will be also fed to one shot- or monomultivibrator 27 which is so designed and arranged that if pushbuttons have not been depressed within a predetermined period such as five seconds, a signal will be generated and fed to OR-gate 28 which acts then to reset the whole circuit arrangement.

As was briefly described hereinbefore, the output signal from presetter 10 is fed to the counter 11. The latter comprises said OR-gate 23 and an address counter 29 which is constituted by an up-down counter, thus having up-inlet and down-inlet as shown. As shown, the output of OR-gate 23 is fed to the up-inlet. This address counter 29 is so designed and arranged to feed address signals to RAM 30 and P-ROM 31 to be described.

Therefore, it will be noted that the digit output signals from the presetter 10 by depressing pushbuttons at 21 are counted at the address counter.

The output signal from address counter 9 constitutes the address input to RAM 30 and P-ROM 31 (programmable ROM) and output signals from these RAM and P-ROM are fed to comparator propers 40 and 41, respectively. To these comparator propers, the output signals from pushbuttons 21*a*-21*e* are also fed. Thus, the second comparator proper 40 makes successive comparison of pushbutton output with arbitrary signal code, digit by digit. In the similar manner, the first comparator proper 41 makes successive comparisons of pushbutton outputs with permanent signal code, digit by digit.

The output signal from the comparator proper 41 is used as the input signal to a shift register 43 at its input G (gate), the shift register performing a right/left shift (RS/LS) and providing parallel outputs as shown. This shift register may be replaced by an up-down counter, if necessary, although not shown.

Upon execution of successive actuations of the pushbutton switch group at 21, the comparator proper 41 compares this signal code with the content in P-ROM 31. When there is coincidence between these two signals, a coincidence signal will be delivered from the comparator 41 to shift register 43 at its gate input G, while pushbutton code signal is fed to the same shift register at its shift input RS. Therefore, an output signal will appear at 01-outlet of the shift register 43. In the similar way, when 7-digit signal appearing by selective and seven successive depressions of the five pushbuttons at 21 coincides prefectly and successively with the 7-digit signal code restored in P-ROM 31, output signals will appear at all the output terminals 01-07 so that AND-gate 44*b* will be opened, thereby RS-flip flop 46 being set.

By bringing the flip-flop 46 into a set state, an output signal will appear at its output terminals Q and the reset signal is fed through OR-gate 47 to comparator proper 42 and flip-flop 45.

Under these conditions, RS-Flip-Flop 46 delivers an output signal to inverter 49, thereby the related terminal of a display unit 51 being earthed and the latter being ignited. This ignition demonstrates such fact that the 7-digit code signal delivered from the pushbutton series 21 is completely in coincidence with the permanent signal and any selected arbitrary code signal can be set in the corresponding memory.

At this stage, output signal from RS-flip-flop 46 shifts RAM 30 to its ready-for-writing-in state and opens the gate circuit 39 which may be of the SCR type. In this way, RAM 30 is made ready for receiving pushbutton signal code from the button series 21 for memorizing it therein.

Since the value at the address counter 29 has been set to 7, an output signal will appear at 07-terminal of value detector 38 which may be composed of a diode matrix of known arrangement, thereby one of input terminals of AND-gate 37 being energized to its high level, while another input terminal of the AND-gate is fed with the output of RS-flip-flop 46 and thus opened. The output signal of the AND-gate 37 is then fed through OR-gate 35, differentiating circuit 33 and OR-gate 32 to address counter 29 which is therefore brought into resetting. At this stage, the comparison of the permanent code signal has been completed and the whole circuit is ready for receiving switch signal for memorizing arbitrary signal.

Under these conditions, shift register 42 and RS-flip-flop 45 are in reset states by the output signal from RS-flip-flop 46 and thus inoperative.

When the pushbutton group 21 is depressed selectively five times successively for generating and memorizing an arbitrary 5-digit code signal, address counter 29 will count 5 and an output signal will appear at output terminal 05 of value detector 38.

Since there is Q-output at RS-flip-flop 46, AND-gate 34 will deliver an output through OR-gate 35, differentiator 33 and OR-gate 32 to address counter 29 so as to reset the latter. The said output is also delivered to AND-gate 50 so as to open the latter. The signal is fed through OR-gate 48 to reset terminals of shift register 43 and RS-flip-flop 46 for resetting them. Therefore, no Q-output signal will be issued from RS-flip-flop 46 and the gate 39 is in a closed state. Thus, RAM 30 changes its state from "write-in" to "read-out", thereby the display 51 will be distinguished. At this stage, the memorizing job of the arbitrary code signal has been completed.

In order to unlock the electric lock, pushbutton group is selectively and correctly depressed five times in successive order to feed the switch signal code to the comparator 40 where the thus fed-in signal is subjected to comparison with the already memorized arbitrary code signal in RAM 30 and successively in the order of address signal delivered from address counter 29. When all the five digits have been found in coincidence, all output terminals 01-05 of shift register 42 are at high potential so that AND-gate 44*a* is opened and RS-flip-flop 45 is set. Thus, an output signal will appear at Q-terminal of the flip-flop 45 and monomultivibrator 57 is triggered. Therefore, a signal will be delivered therefrom through inverter 62 to operate the solenoid 67 for unlocking the lock on the operator's side vehicle door. However, if the vehicle is running, an output signal is delivered from vehicle run sensor 52 through OR-gate 47 to reset terminals of shift register 42 and RS-flip-flop 45 for inhibiting otherwise occurrence of the unlock.

With the RS-flip-flop 45 kept in a set state, one side inlet terminals of AND-gates 61, 63 and 64 are kept at high potential and the other input signals are ready for receiving respective input signals.

With the RS-flip-flop 45 kept in a set state and with output signal at 05 terminal of value-detector 38, AND-gate 36 is opened and its output signal will be conveyed through OR-gate 35, differentiator 33 and OR-gate 32 to address counter 29 for resetting.

When second pushbutton 21*b* is depressed under these cnditions monomultivibrator 56 is triggered and AND-gate 61 is opened so that all door unlock solenoid 66 becomes conductive.

In the similar way, when the fourth pushbutton switch 21*d* is depressed, monomultivibrator 58, AND-gate 63 and solenoid 68 become conductive for opening all the vehicle windows.

In the similar way, when the fifth pushbutton switch 21*e* is depressed, the vehicle trunk lid, not specifically shown, is unlocked. Under the set position of RS flip-flop 45, when the same pushbutton switch is depressed upon once released, the address counter 29 is each time reset by the corresponding application of the output signal coming from OR-gate 23. Thus, successive or practically continuous operation for opening the trunk lid can be performed, if wanted.

When the first pushbutton switch 21*a* is depressed under the set position of RS-flip-flop 45, all the vehicle doors are locked. In this case, the output signal from AND-gate 54 is conveyed through OR gate 28 to address counter 29, shift register 42 and RS-flip-flop 45 for resetting.

Numeral 26 represents a power reset which is so designed and arranged as conventionally that it is brought automatically into its reset position upon connection with vehicle power source, not specifically shown. There is a sixth pushbutton switch 21*f* on the dash 21, which switch serves for correction service as will be described. When this pushbutton switch is depressed, a signal is delivered therefrom through anti-chattering circuit 22 and first delay circuit 24 to left shift terminals LS of shift registers 20 and 21, and to down terminals of address counter 29. It will thus be seen that by depressing this correction service button 21*f*, address counter 29 and shift registers 40 and 41 is brought back into respective one-step-before positions. Therefore, instantly thereupon, correctly selected presetting pushbutton switches can be redepressed as desired. Thus, occasionally performed false button manipulation can be corrected in a highly easy and convenient manner.

Value detector 38 has a further output terminal 020 which serves for antiprank purposes. This output terminal 020 is electrically connected through monomultivibrator 70 to an alarm such as a vehicle horn 71. This arrangement may serve well for such case that if the number of maloperated pushbuttons should exceed over the regularly specified number of buttons, the alarm horn 71 will be automatically operated for a predetermined time period which has been preset at the related monomultivibrator 70. At the same time, the address counter 29 will be brought into resetting through the action of OR-gate 35 and differentiator 33.

The embodiments of the invention in which an exclusive property or privilege is claimed are as follows:

1. An apparatus control system, comprising:

an apparatus to be controlled;

a number presetter in the form of a switch board including a certain number of pushbutton switches for delivering a number code signal by depressing said pushbutton switches sequentially and selectively in a desired order;

a first memory for storing a predetermined content representing a permanent code signal specifically selected beforehand for the said apparatus to be controlled;

a first comparator for comparing the permanent memory content in said first memory with a first code signal generated at and delivered by said presetter;

a second memory for storing an arbitrary number code;

a second comparator being activated by said first comparator upon a match between said first code signal and said permanent code signal and for comparing a second code signal generated by said number presetter with said arbitrary number code;

an address counter for delivering address signals to said first and second memories upon reception of successive segments of said code signal fed from the presetter;

a first shift register for receiving output signals from the first comparator; and a second shift register for receiving output signals from the second comparator;

said apparatus being brought into actuation or release upon reception of the presetter's output number code signal and the output signal from one of said shift registers only when there is concurrence of output signals of said first and second comparators.

2. The apparatus control system of claim 1 wherein the first memory is a programmable read-only memory, while the second memory is a random access memory.

3. The apparatus control system of claim 2, wherein the address counter and shift register have functional positions corresponding to successive segments of a code signal being compared, and wherein said presetter further comprises a correction service pushbutton which is electrically connected to a number correction circuit for correcting an incorrect signal as a result of false-key-operation of the number presetter in such a way that the address counter and the shift register are brought restoringly to a functional position just one step before the incorrect digit or digit series upon depression of the number correction service pushbutton.

4. The system of claim 3 in which the apparatus is controlled through an RS flip-flop which is set when the first register is brought into high potential at all input terminals as a result of introduction of a number correction signal by manipulation of the number correction service pushbutton.

* * * * *